United States Patent

Kitaoka et al.

[15] 3,686,431

[45] Aug. 22, 1972

[54] FM-FM AUDIO MULTIPLEX UNIT FOR TELEVISION BROADCASTING SYSTEM

[72] Inventors: Kouichi Kitaoka; Taku Ichihara, both of Yokohama, Japan

[73] Assignee: Tokyo Shibaura Electric Co., Ltd., Kawasaki-shi, Japan

[22] Filed: Dec. 2, 1971

[21] Appl. No.: 204,147

Related U.S. Application Data

[63] Continuation-in-part of Ser. No. 46,959, June 17, 1970, abandoned.

[30] Foreign Application Priority Data

June 20, 1969 Japan ......................44/58010

[52] U.S. Cl. .......178/5.8 R, 179/15 BM, 179/15 BT, 325/145, 332/21

[51] Int. Cl. ............................H04n 7/06, H04j 1/20

[58] Field of Search ............178/5.6, 5.8 R, DIG. 23; 179/15 BT, 15 BM; 332/21, 14; 325/145, 148

[56] References Cited

UNITED STATES PATENTS

| | | | |
|---|---|---|---|
| 2,697,745 | 12/1954 | Halstead | 178/5.8 R |
| 3,046,329 | 7/1962 | Reesor | 178/5.6 |
| 3,069,505 | 12/1962 | Collins, Jr. et al. | 179/15 BT |
| 3,201,718 | 8/1965 | Trojak | 332/14 X |
| 3,549,795 | 12/1970 | Mullin | 178/5.6 |

*Primary Examiner*—Robert L. Richardson
*Attorney*—Robert D. Flynn et al.

[57] ABSTRACT

An FM-FM audio multiplex unit for television broadcasting systems comprising a multivibrator type frequency modulator having a multivibrator for producing sub channel signals frequency modulated by audio sub channel signals, means for producing signals having double the frequency of horizontal synchronizing signals and an automatic phase controller for controlling the carrier frequency of the sub channel signals, the phase controller including a reference signal oscillator, first and second mixers for mixing the carrier signals in the sub channel signals and the signals having double the frequency of horizontal synchronizing signals with reference signals to obtain signals having high frequencies, first and second divider sections for dividing the frequencies of output signals from the first and second mixers to obtain signals having low frequencies and a phase detector for comparing the phases of output signals from the first and second dividers each other thereby making small the frequency variation of the horizontal synchronizing signals and the sub carrier signals, and resulting in causing the carrier signals of the sub channel signals to be synchronized with those having double the frequency of the horizontal synchronizing signals.

6 Claims, 3 Drawing Figures

FM-FM AUDIO MULTIPLEX UNIT FOR TELEVISION BROADCASTING SYSTEM

CROSS-REFERENCE TO RELATED APPLICATION

This invention is a continuation-in-part application of the prior application having the U.S. Application Ser. No. 46,959, filed on June 17, 1970 now abandoned.

BACKGROUND OF THE INVENTION

This invention relates to an FM-FM audio multiplex unit and, more particularly, to an automatic frequency controlling means for a sub channel modulation section.

The FM-FM audio multiplex unit for a television broadcasting system herein refers to an audio multiplex unit for a television utilizing a well-known FM-FM system, in which sub carrier signals having twice the frequency of horizontal synchronizing signals are frequency modulated by audio sub channel signals, the frequency modulated sub channel signals thus produced are mixed with audio main channel signals, and further the mixed signals modulate main carrier signals to produce audio multiplex signals.

In a television receiver using an inter carrier system, there are caused buzz noises in reproduced sub channel signals under the effect of the phase modulated components included in amplitude-modulated video signals. These buzz noises become prominent when sub carrier signals are not synchronized with horizontal synchronizing signals. Whereas the horizontal synchronizing signals are subject to rigid limitation in a color television system to obtain a high stability, their frequencies are generally allowed to vary considerably in a monochromatic television system. The frequencies of sub carrier signals are caused to vary in response to the frequency variation of the horizontal synchronizing signals. When the horizontal synchronizing signals and the sub carrier signals vary greatly in frequency, both signals are not synchronized with each other. It is difficult in the prior art circuit to cause the sub carrier signals to be synchronized with horizontal synchronizing signals directly.

SUMMARY OF THE INVENTION

An object of the invention is to provide an FM-FM audio multiplex unit for a television, which causes sub carrier signals to be more accurately synchronized with horizontal synchronizing signals by making small the frequency variation of the horizontal synchronizing signals and the sub carrier signals through an automatic phase controlling circuit, thereby to minimize buzz noises in reproduced audio sub channel signals.

According to this invention, there is provided an FM-FM audio multiplex unit for television broadcasting systems comprising a multivibrator type frequency modulator having an astable multivibrator, the modulator producing sub channel signals frequency modulated by audio sub channel signals, means for producing horizontal synchronizing signals, an automatic phase controller for controlling the frequency of the sub carrier signals, means for mixing the sub channel signals from the modulator with main channel signals, and means for frequency-modulating main carrier signals by the output signals from the mixing means, wherein said automatic phase controller comprises a reference signal oscillator, a first mixer for mixing signals having double the frequency of the horizontal synchronizing signals with the reference signals, a first divider section for dividing the frequency of the output signals from the first mixer, a second mixer for mixing the carrier signals in the sub channel signals with the reference signals, a second divider section for dividing the frequency of the output signals from the second mixer, and a phase detector for obtaining the signals corresponding to the phase difference between the output signals from the first and second divider sections and the modulator includes a differential amplifier for amplifying the audio sub channel signals in accordance with the output signals from the phase detector to control the frequency of the sub carrier signals with reference to the horizontal synchronizing signals.

DETAILED DESCRIPTION OF THE INVENTION

The invention will now be described in conjunction with a preferred embodiment thereof with reference to the accompanying drawings.

Figure 1:
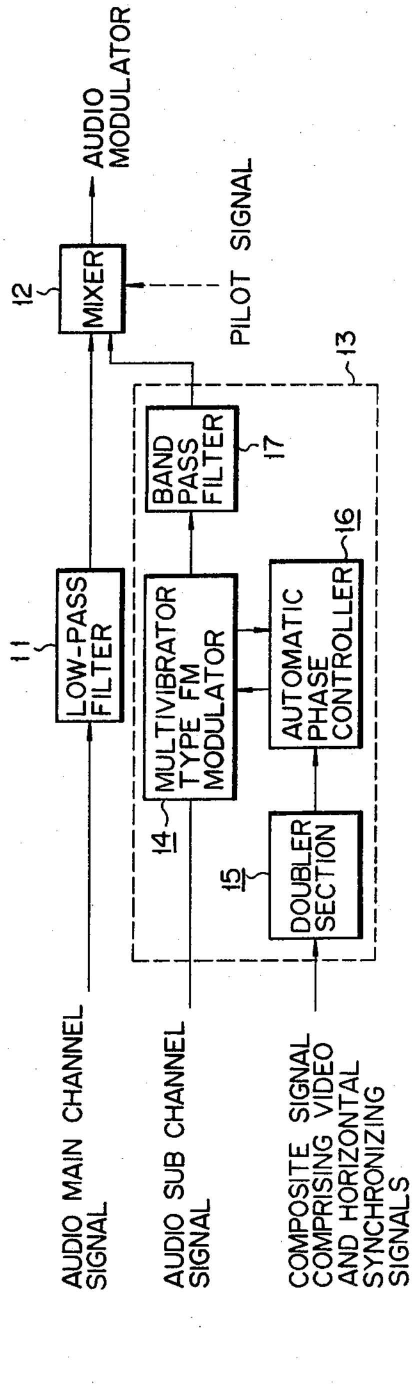
FIG. 1 shows a block diagram of an embodiment of the FM-FM audio multiplex unit according to the present invention.

Referring to FIG. 1, audio main channel signals coming from an audio signal producing section, not shown, in the television broadcasting system, which may be the addition signals containing the left and right signal components in case of the FM stereophonic broadcasting or the main program signals in case of composite program broadcasting, are fed through a low-pass filter 11 to a mixer 12. Meanwhile, audio sub channel signals coming from the above-mentioned audio signals producing section, which may be the subtraction signals containing the left and right signal components in case of the FM stereophonic broadcasting or the sub program signals in case of the composite program broadcasting, modulate carrier signals in a sub channel modulator section generally designated at 13. The sub channel modulator section 13 includes a multivibrator type frequency modulator 14 having a multivibrator self-oscillating at the sub carrier frequency of 31.5 KHz. Thus, the sub carrier signals are frequency-modulated with the audio sub channel signals covering a bandwidth of about 50 Hz to 15 KHz.

On the other hand, composite signals comprising video and synchronizing signals are introduced into a frequency doubler section 15, in which the frequency of horizontal synchronizing signals is doubled, and the output of which is fed to an automatic phase controller 16. The automatic phase controller 16 also receives the sub channel signals from the frequency modulator 14 and converts the phase difference between the output signal from the frequency doubler section 15 and the sub carrier signals into the corresponding D.C. voltage for negative feedback to the modulator 14 to control the bias voltage on the astable multivibrator so as to synchronize the frequency of the oscillation of the multivibrator with double the frequency of the horizontal sychronizing signals. The output of the modulator 14 is passed through a band-pass filter 17 having a bandwidth of about 16.5 KHz to 46.5 KHz, and the filtered output is fed to the mixer 12. In the mixer 12 both the main channel signals and the subchannel signals, and also a pilot signal introduced from a pilot source, not shown, in case of the FM broadcasting, are combined together to produce a resultant signals synthesized by the use of the frequency division principle. The output signals from the mixer 12 are impressed on an audio modulator, not shown, to frequency modulate the main carrier signals.

Figure 2:
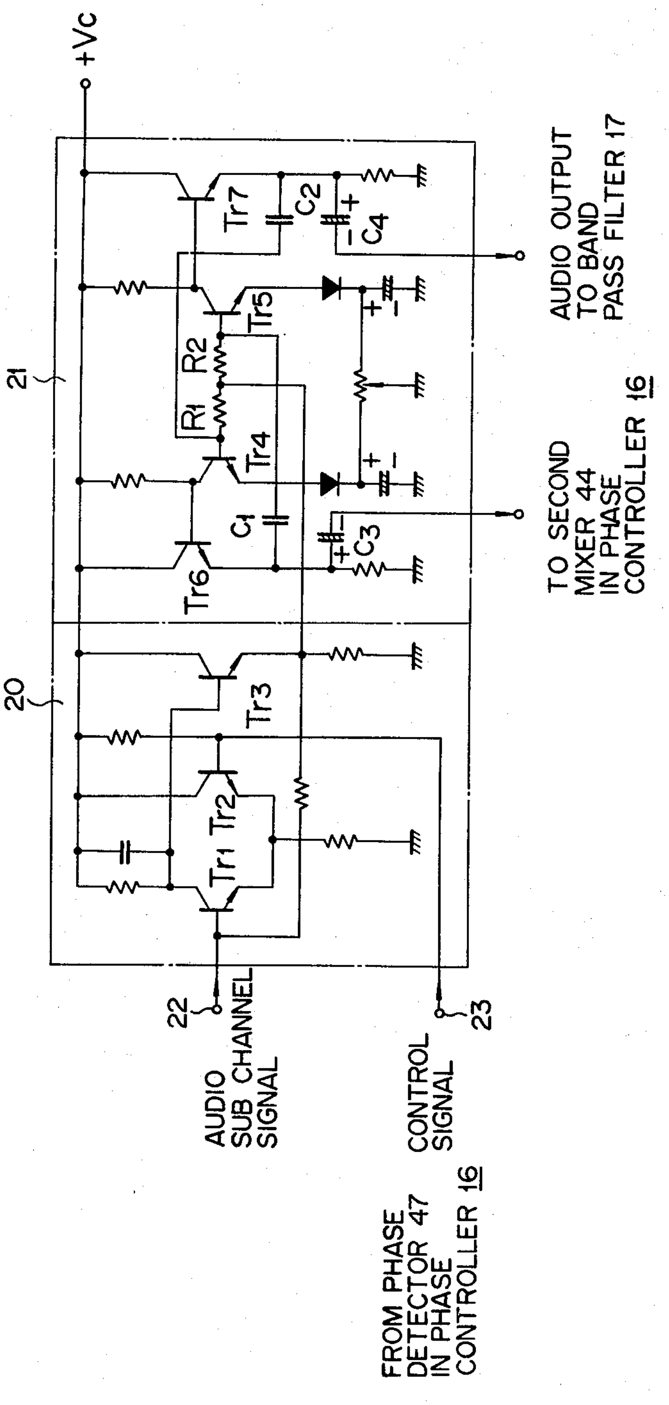
FIG. 2 shows a detailed circuit construction of a multivibrator type frequency modulator used in the embodiment shown in FIG. 1.

FIG. 2 is a detailed circuit diagram of a multivibrator type FM modulator 14. As illustrated, the FM modulator 14 consists of, for example, an amplifier 20 and modulator 21. It is preferred that the amplifier 20 be of a differential type to amplify audio signals in accordance with control signals. This differential amplifier consists of a circuit including transistors $Tr_1$ and $Tr_2$. The base of the transistor $Tr_1$ is supplied with audio sub channel signals conducted to the input terminal 22 of said amplifier 20 and the base of the transistor $Tr_2$ is supplied with control signals transmitted to the control input terminal 23 thereof. Output signals from said differential amplifier 20 are conducted to the modulator 21 through an emitter follower of a transistor $Tr_3$. The modulator 21 is an astable multivibrator consisting of transistors $Tr_4$, $Tr_5$, $Tr_6$ and $Tr_7$. As is well known, the center frequency or carrier frequency is determined jointly by capacitors $C_1$ and $C_2$ and resistors $R_1$ and $R_2$. In the astable multivibrator, the capacitors $C_1$ and $C_2$ constitute a feedback loop through the emitters of the transistors $Tr_6$ and $Tr_7$. The circuit of these transistors $Tr_6$ and $Tr_7$ is of an emitter follower type so as to act as a buffer amplifier. The emitter of the transistor $Tr_6$ is connected to the second mixer of an automatic phase controller through a capacitor $C_3$. The emitter of the transistor $Tr_7$ is connected to a band pass filter 17 through a capacitor $C_4$. Output signals from the amplifier 20 are applied as modulating signals to the bases of the transistors $Tr_4$ and $Tr_5$ of the modulator 21. Though the modulator 21 has signals of the center frequency generated by the astable multivibrator, the bias voltage of the bases of the transistors $Tr_4$ and $Tr_5$ is varied by modulating signals, thus producing frequency-modulated signals. Such a multivibrator type FM modulator presents little variation in differentiation characteristics representing the linearity of modulation or the degree of modulation distortion, and moreover has the advantage of being more simply arranged than an FM modulator using a reactance transistor or serrasoid modulator.

There will now be described the automatic phase controller 16 for synchronizing the center frequency of the multivibrator type FM modulator 14 or the carrier frequency with twice the repetition frequency of horizontal sychronizing pulses.

The automatic phase controller of this invention consists in comparing by a phase detector phase differences between mixed signals consisting of output signals from a reference oscillator of extremely high frequency stability, for example, a crystal oscillator and horizontal synchronizing signals and other mixed signals consisting of signals having the center frequency of the frequency modulator and signals from the reference oscillator so as to bring said phase differences substantially to be equal to each other.

Figure 3:
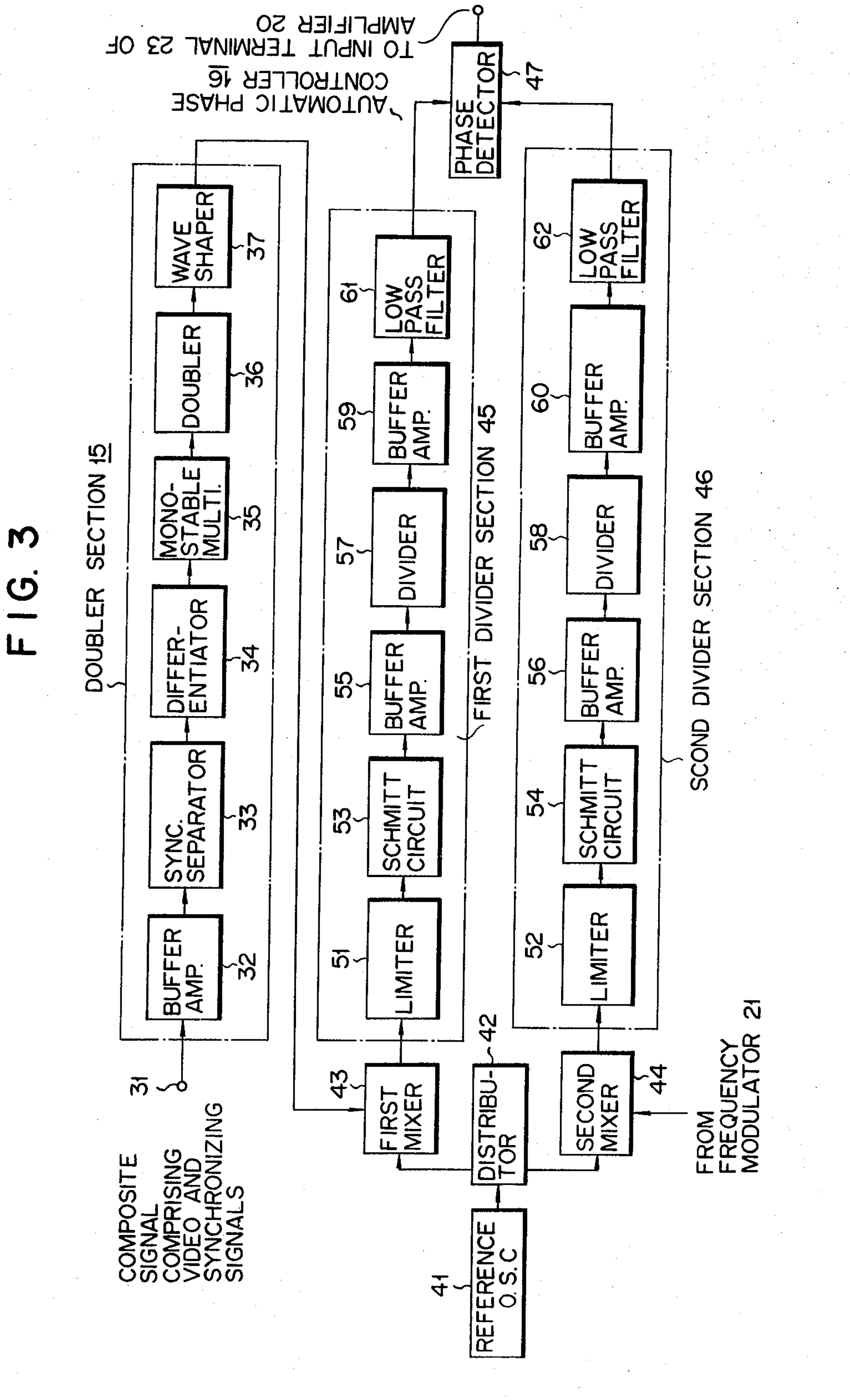
FIG. 3 represents a detailed circuit construction of an automatic phase controller used in the embodiment shown in FIG. 2.

FIG. 3 shows a doubler section 15 for multiplying the frequency of horizontal synchronizing signals and automatic phase controller 16. The doubler section 15 draws out horizontal pulses of repetition frequency $f_H$ from composite signals consisting of video signals and synchronizing signals to obtain sine waves having a frequency $2f_H$. Composite signals conducted to an input terminal 31 are amplified by a buffer amplifier 32 and the horizontal synchronizing pulses in the composite signals are separated by a synchronizing separator 33. These pulses are supplied to a differentiator 34, which generates positive and negative differentiated pulses at the front and back edges of said pulses respectively. Either of both forms of pulses is used to trigger a monostable multivibrator 35. In a television system where there is conducted interlaced scanning, synchronizing pulses contain equalizing pulses, so that the time constant of the monostable multivibrator 35 is so determined as to have an accurate repetition frequency $f_H$ defined thereby. Output pulses from said monostable multivibrator 35 are frequency-multiplied to $2f_H$ by a doubler 36, converted to sine wave signals by a wave shaper 37, and finally turned into the sub channel carrier signals.

The automatic phase controller 16 consists of a reference oscillator 41, distributor 42, first and second mixers 43 and 44, first and second divider sections 45 and 46 and phase detector 47. The reference oscillator 41 generates signals having a frequency of, for example, $1,022f_H$. These signals are conducted through the distributor 42 to the first and second mixers 43 and 44. In the first mixer 43 the signals having a frequency of $1,022f_H$ are mixed with signals having a frequency $2f_H$ generated by the doubler section 25 to form signals having a frequency of $1,024f_H$. When the frequency variation of horizontal synchronizing signals is expressed as $\Delta f_H$, the frequency of output signals from the mixer 43 is expressed as $1,024f_H + 2\Delta f_H$. In the second mixer 44, signals having a frequency of $1,022f_H$ are mixed with carrier signals of substantially $2f_H$ frequency which are obtained through a filter, not shown, from the signals generated by the frequency modulator 21, to form signals having a frequency of $1,024f_H$. The aforementioned signals are frequency divided approximately to an extent of 1/1024 by the first and second divider sections 45 and 46 so as to have a frequency substantially the same as that of horizontal synchronizing signals. When there occurs the frequency variation $\Delta f_H$ in horizontal synchronizing signals, the frequency of output signals from the first divider section 45 equals to $(1,024f_H+2\Delta f_H)/1,024=f_H+(2/1,024)\Delta f_H$, thereby causing only the frequency variation $(2/1,024)\Delta_H$ in the output signals from the first divider section 45. When there occurs the frequency variation in signals from the frequency modulator 21 in response to that of the horizontal synchronizing signals, the variation becomes considerably small through the second mixer 44 and the second divider section 46 similarly. Even in case the center frequency of the signals from the frequency modulator 21 does not exist, as the signals from the frequency modulator 21 are mixed with the reference signals having a high frequency of 1,022 KHz, signals having the frequency nearly equal to the center frequency can be obtained from the second divider section 46. The first and second divider sections 45 and 46 are of the same arrangement as illustrated. Signals are first shaped into rectangular wave signals through limiters 51 and 52 of said sections and Schmitt circuits 53 and 54 so as to be easily counted. The wave-shaped signals are supplied to dividers 567 and 58 through buffer amplifiers 55 and 56, each of which constitutes a counting circuit consisting of 10 flip-flop circuits to count down input signals, thereby forming signals having repetition frequency of substantially $f_H$. These $f_H$ signals are converted to sine wave signals through buffer amplifiers 59 and 60 and low pass filters 61 and 62. The phase detector 47 supplies control signals to the amplifier 20 of the multivibrator type FM modulator 14 by comparing the phase of output signals from the first divider section 45 with that of output signals from the second divider section 46.

The automatic phase controller 16 of this invention causes output signals from the reference oscillator 41, horizontal synchronizing signals from the doubler section 15 and signals from the frequency modulator 21 representing its center frequency to be mixed with signals of reference frequency in the first and second mixers 43 and 44 and later subjected to frequency division by the first and second divider sections 45 and 46 so as to be considerably small amount of frequency variation, thus offering the advantage of easily realizing complete synchronization, even though horizontal synchronizing signals may widely vary in frequency and/or the sub carrier signals may be deeply modulated by sub channel signals.

As mentioned above, the present invention provides the FM-FM audio multiplex unit for television broadcasting systems, which causes audio sub carrier signals to be synchronized with horizontal synchronizing signals in a simple construction, thereby to minimize the effect of the phase modulated components included in the amplitude modulated video signals or buzz noises in reproduced sub channel signals.

The frequency of 31.5 KHz, double the frequency of the horizontal synchronizing signals, adopted as the sub carrier frequency in the above embodiment is by no means limitative, and similar effects may be obtained so long as the frequency of the sub carrier signals is low, for instance 30 KHz.

What we claim is:

1. FM-FM audio multiplex unit for television broadcasting systems comprising a multivibrator type frequency modulator having an astable multivibrator, the modulator producing sub channel signals frequency-modulated by audio sub channel signals, means for producing horizontal synchronizing signals, an automatic phase controller connected to both of the modulator and the horizontal synchronizing signal producing means for controlling the carrier frequency of the sub channel signals, means connected to the modulator for mixing the sub channel signals from the modulator with main channel signals, and means connected to the mixing means for frequency modulating main carrier signals by the output signals from the mixing means, wherein said automatic phase controller comprises a reference signals oscillator, a first mixer connected to both of the horizontal synchronizing signal producing means and the oscillator for mixing the horizontal synchronizing signals with the reference signals, a first divider section connected to the first mixer for dividing the frequency of the output signals from the first mixer, a second mixer connected to both of the modulator and the oscillator for mixing the sub channel signals with the reference signals, a second divider section connected to the second mixer for dividing the frequency of the output signals from the second mixer, and a phase detector connected between the both of the first and second dividers and the modulator, for obtaining the signals corresponding to the phase difference between the output signals from the first and second divider sections which control the frequency of the sub carrier signals with reference to the horizontal synchronizing signals.

2. The FM-FM audio multiplex unit according to claim 1 wherein said reference signal oscillator generates signals having higher frequencies than those of the sub carrier signals.

3. The FM-FM audio multiplex unit according to claim 2 wherein said horizontal synchronizing signal producing means comprises a synchronizing separator which is supplied with the composite signal comprising video signals and horizontal synchronizing signals and produces the horizontal synchronizing signals and a doubler supplied with the synchronizing signals for producing the signals having double the frequency of the synchronizing signals and said phase detector controls the modulator to cause the sub carrier signals to be synchronized with signals having double the frequency of the horizontal synchronizing signals.

4. The FM-FM audio multiplex unit according to claim 3 wherein said synchronizing signal producing means further comprises a buffer amplifier supplied with the composite signal whose output terminal is connected to said synchronizing separator, a differentiator connected to the output terminal of the separator, a monostable multivibrator connected to the output terminal of the differentiator, whose output terminal is connected to said doubler, and a wave shaper connected to the output terminal of the doubler.

5. The FM-FM audio multiplex unit according to claim 2 wherein said first and second devider sections each comprise a series connection of a limiter supplied with the output signals from the mixer, a Schmitt circuit, a first buffer amplifier, a divider, a second buffer amplifier and a band pass filter whose output terminal is connected to the phase detector.

6. The FM-FM audio multiplex according to claim 2 wherein said multivibrator type frequency modulator includes a differential amplifier connected between the phase detector and the multivibrator supplied with the sub channel signals, which compares the sub channel signals with the output signals from the phase detector to control the repetition frequency of the multivibrator.

* * * * *